(12) United States Patent
Veltkamp et al.

(10) Patent No.: US 7,644,754 B2
(45) Date of Patent: Jan. 12, 2010

(54) HEAT RECUPERATOR WITH FROST PROTECTION

(75) Inventors: Bart Veltkamp, GD Son (NL); Peter Hoogendoorn, RE Son (NL)

(73) Assignee: Level Holding B.V. (NL)

( * ) Notice: Subject to any disclaimer, the term of this patent is extended or adjusted under 35 U.S.C. 154(b) by 752 days.

(21) Appl. No.: 10/507,492

(22) PCT Filed: Mar. 11, 2003

(86) PCT No.: PCT/NL03/00183

§ 371 (c)(1),
(2), (4) Date: Jun. 13, 2005

(87) PCT Pub. No.: WO03/085327

PCT Pub. Date: Oct. 16, 2003

(65) Prior Publication Data

US 2005/0236136 A1 Oct. 27, 2005

(30) Foreign Application Priority Data

Mar. 11, 2002 (NL) .................................. 1020141

(51) Int. Cl.
*F25D 23/12* (2006.01)
(52) U.S. Cl. .................... 165/267; 165/54; 165/283
(58) Field of Classification Search .............. 165/6, 165/8, 10, 54, 267, 283
See application file for complete search history.

(56) References Cited

U.S. PATENT DOCUMENTS

| 4,391,321 | A | * | 7/1983 | Thunberg | 165/54 |
| 5,024,263 | A | * | 6/1991 | Nyman et al. | |
| 6,062,296 | A | * | 5/2000 | Broberg | |
| 6,289,974 | B1 | * | 9/2001 | Kaminski et al. | |
| 7,231,967 | B2 | * | 6/2007 | Haglid | 165/54 |

* cited by examiner

*Primary Examiner*—Ljiljana (Lil) V Ciric
(74) *Attorney, Agent, or Firm*—Banner & Witcoff, Ltd.

(57) ABSTRACT

A recuperator for transferring thermal energy from a warm gas flow to a cold gas flow, comprising: a first group of ducts with a first connection and a second connection; a second group of ducts with a third connection and a fourth connection, wherein the ducts of both groups extend mutually parallel; a first supply for supplying the cold gas flow to the first connection; a first discharge for discharging the cold gas flow from the second connection; a second supply for supplying the warm gas flow to the third connection; and a second discharge for discharging the warm gas flow from the fourth connection. The device provides temporarily and repeatedly alternating connections from the first supply to the fourth connection; the first discharge to the third connection; the second supply to the second connection; and the second discharge to the first connection. The device further provides a control for repeatedly changing the connections utilizing two alternating valves located at opposite sides of the combination of the first and second group of ducts.

12 Claims, 7 Drawing Sheets

HEAT RECUPERATOR WITH FROST PROTECTION

CROSS REFERENCE TO RELATED APPLICATIONS

This application is a National Stage application of co-pending PCT application PCT/NL03/00183 filed Mar. 11, 2003, which was published in English under PCT Article 21(2) on Oct. 16, 2003 as WO 03/085327, and which claims the benefit of the NL Patent Application No. 1020141 filed Mar. 11, 2002. These applications are incorporated herein by reference in their entireties.

FIELD OF THE INVENTION

The invention relates to a heat exchanger for transferring thermal energy from a warm gas flow to a cold gas flow, comprising:
- a first group of ducts with a first connection and a second connection;
- a second group of ducts with a third connection and a fourth connection, which group is thermally coupled to the first group of ducts;
- first supply means for supplying the cold gas flow to the first connection;
- first discharge means for discharging the cold gas flow from the second connection;
- second supply means for supplying the warm gas flow to the third connection; and
- second discharge means for discharging the warn gas flow from the fourth connection.

BACKGROUND OF THE INVENTION

Such a heat exchanger is generally known, but is known particularly from the Netherlands patent application number 1000706.

Such heat exchangers are usually applied for transfer of gases containing water vapour. The consequence hereof is that the heat content of the relevant gas flow is not only formed by that part of the thermal energy represented by the temperature differences times the heat capacity, but also by the melting and freezing heat of water, and also by the evaporation and condensation heat of water.

The first thermal content is also designated sensible heat and the second type, representing the phase change, is also referred to as latent heat. Both forms of energy together are also referred to as enthalpy.

The known heat et hanger is adapted to transfer the sensible heat.

In many fields of application, as a result of the conditions of use, condensation and freezing of water absorbed into the gas flow usually takes place in the cooling gas flow. The freezing results in blockage of the ducts, and thereby in the heat exchanger being unusable.

The effectiveness of the heat exchanger is moreover reduced because it is not possible as a result of temperature differences to transfer the latent heat resulting from condensation and freezing to the heated gas flow. The second law of thermodynamics does after all state that it is only possible to allow thermal energy to pass from a mass with a higher temperature to a mass with a lower temperature.

BRIEF DESCRIPTION OF THE INVENTION

The object of the present invention is to provide such a heat exchanger, wherein no freezing occurs and wherein latent heat is preferably also transferred.

This object is achieved in that the device comprises alternating means for temporarily and repeatedly alternating in pairs the supply and discharge means on the connections.

As a result of these measures the function of the first group of ducts and the second group of ducts, the flow direction through the ducts or both are regularly alternated. The above stated drawbacks are hereby avoided.

It is herein noted that the effects of the invention are most clearly apparent in heat exchangers with a direct, intimate coupling between the ducts, i.e. in heat exchangers wherein the thermal energy is transferred without storage in the mass of the heat exchanger itself. Such heat exchangers are also known as recuperators.

According to a first embodiment, the alternating means are adapted to temporarily connect:
- the first supply means to the fourth connection;
- the first discharge means to the third connection;
- the second supply means to the second connection; and
- the second discharge means to the first connection.

In this preferably applied embodiment, the function of the first group of ducts and the second group of ducts is regularly alternated. This has the consequence that the water vapour from the gas flow which has condensed or frozen to ice in the first group of ducts is absorbed by the heating gas flow after alternating the function of the ducts. Blockage by the ice is herein reduced and then brought to an end.

An additional advantage is that the melting and evaporation heat in question is reused and a better thermal equilibrium results. The humidity level prevailing on the "warm" side of the heat exchanger is hereby maintained or at least hardly decreased.

This preferred embodiment alternates the functions of the groups of ducts. This has the consequence that a form of leakage occurs between the groups of ducts during the alternations.

It is possible to absorb the heat released during condensation and freezing of the water in the second group of ducts by causing water to evaporate in the first group of ducts. When the air does not contain sufficient moisture, it is possible to make use for this purpose of supply means 80 to supply water to the first group of ducts.

In situations where both groups of ducts must remain strictly separated, use can be made of another embodiment wherein the device comprises means for temporarily connecting;
- the first supply means to the second connection;
- the first discharge means to the first connection;
- the second supply means to the fourth connection; and
- the second discharge means to the third connection.

The effectiveness of this embodiment is however lower than that of the first stated embodiment, so that this latter one must only be applied when a strict separation between the gas flows is important.

Another embodiment teaches that the alternating means are adapted to temporarily connect the first supply means to the third connection, the first discharge means to the fourth connection, the second supply means to the first connection and the second discharge means to the second connection.

According to a further preferred embodiment the heat exchanger comprises control means for repeatedly changing the connections.

The above stated measures of course have an effect with a limited duration. By causing the alternation to occur repeatedly, the effects are obtained over a long and in principle unlimited period of time.

It is possible to adapt the control means to carry out the alternation at fixed intervals. It is pointed out here that the results depend on the conditions, such as composition of the gas flow, for instance air which is in many cases provided with a large quantity of water vapour. The temperatures, in particular the temperature difference between the "warm" and "cold" side of the heat exchanger, are of great importance here. The absolute temperature is also important in respect of processes which take place for instance both above and below the freezing point of water.

It is therefore attractive to have the alternating frequency depend on the conditions. This is achieved in an embodiment wherein the alternation is carried out when a measurement value is reached. A measurement value can be understood to mean a temperature, but also a relative or absolute humidity or another variable which can be measured at a determined location in the heat exchanger.

Although the invention is not only applicable to recuperators for use in buildings, this is however where the advantages thereof become particularly manifest.

The heat exchanger is therefore preferably formed by a recuperator for recovering thermal energy from ventilating air of a building.

When the construction of the recuperator is applied as described in the Netherlands patent application number 1000706, it is attractive when the first connection and the fourth connection debauch in a first chamber, and the second connection and the third connection debauch in a second chamber. It is then structurally simple for the alternating means to comprise two valves, each arranged in one of the chambers.

BRIEF DESCRIPTION OF THE DRAWINGS

The present invention will be elucidated hereinbelow with reference to the annexed drawings, in which.

DETAILED DESCRIPTION OF THE INVENTION

Figure 1A:
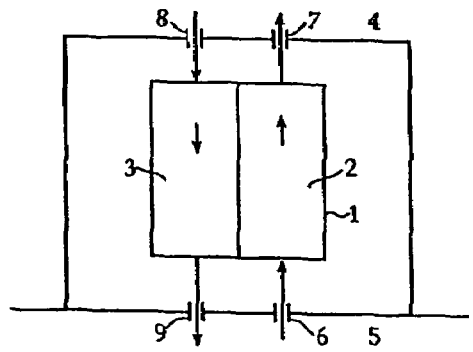
FIG. 1A shows a diagram of a heat exchanger according to the prior art.

FIG. 1A shows schematically a heat exchanger designated as a whole with 1, which comprises a first group of ducts 2 and a second group of ducts 3 or the construction of such a heat exchanger reference is made to the Netherlands patent application number 1000706.

It is assumed for the sake of clarity that the heat exchanger functions as a recuperator for ventilating air in a building, and that the inside of the building is designated with 4 and the outside of the building is designated with 5. The ventilating air is supplied from outside by first supply means 6. Air which has passed through the first group of ducts 2 is carried to the interior of the building via first discharge means 7.

The air coming from the inside 4 of the building is supplied to the second group of ducts 3 via second supply means 8. After passing through the second group of ducts, this air is discharged to the outside again via the second discharge means 9.

The first group of ducts 2 and the second group of ducts 3 are thermally coupled to each other so that the heat relinquished by the airflow in the second group of ducts 3 is absorbed by the airflow flowing through the first group of ducts. An effective manner of heating ventilating air is thus obtained.

The recuperator described up to this point corresponds with the recuperator described in the Netherlands patent application already mentioned above.

Figure 1B:
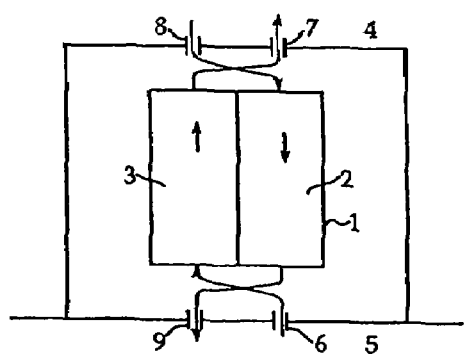
FIG. 1B shows a diagram corresponding to FIG. 1A, wherein the connections of the groups of ducts are alternated as according to a first embodiment of the present invention.

To avoid condensation and possible ice formation at a sufficiently low outside temperature, it is possible as shown in FIG. 1B to reverse the function of the first group of ducts 2 and of the second group of ducts 3. A situation is then obtained as shown in FIG. 1B.

The first supply means 6 herein supply the outside air to the second group of ducts 3, the first discharge means 7 supply the heated air coming therefrom to the inner space 4, the second supply means 8 supply the warm inside air to the first group of ducts 2 and the second discharge means 9 supply the inside air, which has relinquished its heat, to the outside environment 5.

It will be apparent that in the situation shown in FIG. 1B the function of the first and second group of ducts is alternated, so that the inside air now flows through the first group of ducts through which the outside air first flowed, and vice versa. Condensation and ice formed during the situation shown in FIG. 1A will herein melt and evaporate again in the second group of ducts and be fed to the inside environment. This avoids the problem of ice formation and the problems resulting herefrom, such as blockage and hygienic problems possibly resulting from a high humidity level.

A greater effectiveness of the heat exchange is also obtained here; the total enthalpy is transferred. The original humidity level is moreover maintained in the inside space.

Figure 8:
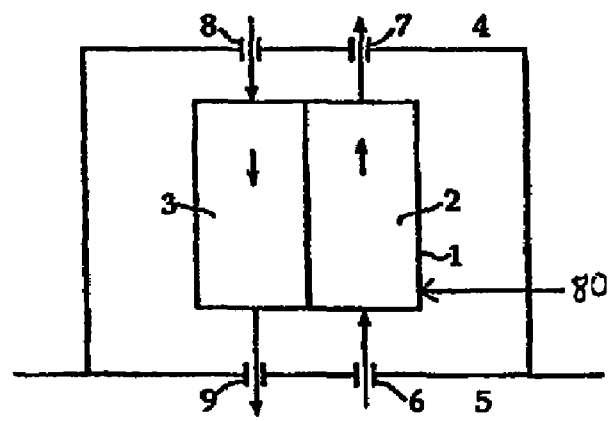
FIG. 8 shows a diagram including a water supply.

Additional water may be supplied through water supply means 80 as identified in FIG. 8.

Figure 1C:
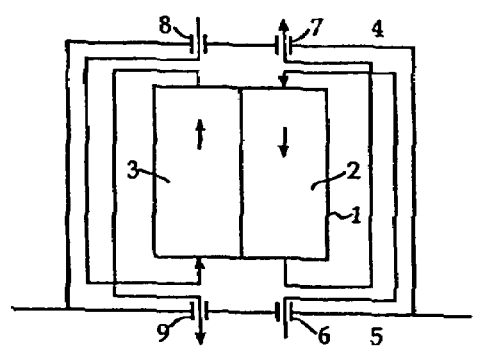
FIG. 1C shows a diagram corresponding to FIG. 1A according to a second embodiment of the invention.

It is possible in principle to apply other configurations; FIG. 1C thus shows a configuration wherein the separation of the gas flows between the groups of ducts is maintained and wherein the flow through the groups of ducts is in opposite directions. This is a possible but less desirable situation; while an improvement is obtained compared to the original situation, the favourable effects are still considerably less than in the solution shown in FIG. 1B.

Figure 1D:
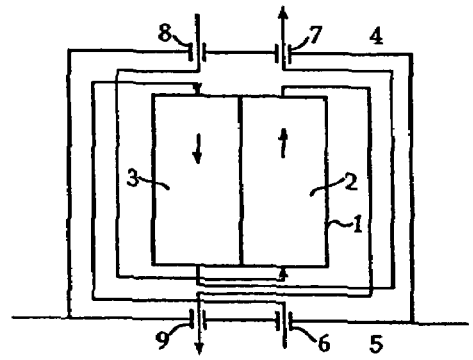
FIG. 1D shows a diagram corresponding to FIG. 1A of a third embodiment of the invention.

A similar consideration applies for the situation shown in FIG. 1D; different gas flows herein flow through the groups of ducts relative to FIG. 1A, thus obtaining the advantages of the situation achieved in FIG. 1B. The flow direction is in opposite direction, which is favourable per se, but which requires complicated technical provisions for the realization thereof.

Figure 2A:
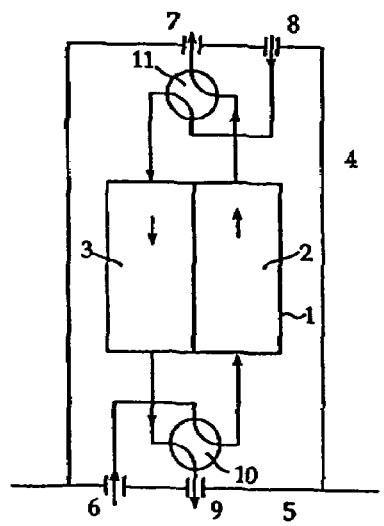
FIG. 2A shows a diagram of a first embodiment of the invention provided with four-way valves, during a first position of the valves.
Figure 2B:
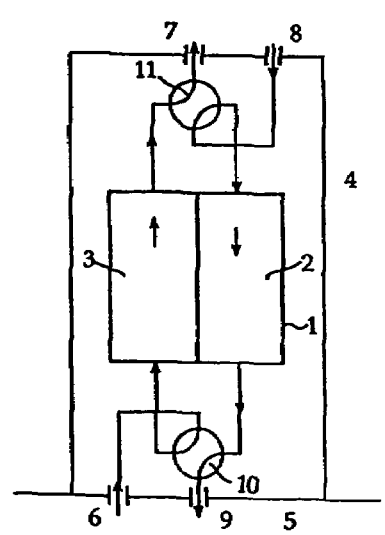
FIG. 2B is a view corresponding to FIG. 2A in the second position of the valves.
Figure 9:
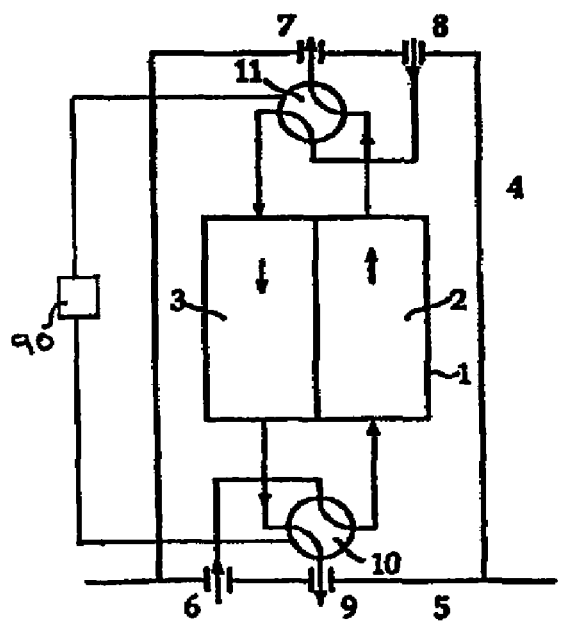
FIG. 9 shows a diagram including control means

FIGS. 2A and 2B show schematically an embodiment in which the regular alternation between the situations show in FIGS. 1A and 1B is achieved. Use is made for this purpose of two simultaneously operated valves 10 respectively 11. In FIG. 2A the valves 10,11 are herein placed in a position in which the configuration of FIG. 1A is obtained, and in FIG. 2B the valves 10,11 are placed in a position in which a configuration of FIG. 1B is obtained. As shown in FIG. 9, the heat exchanger can have control means (90) for repeatedly changing the connections.

Figure 2C:
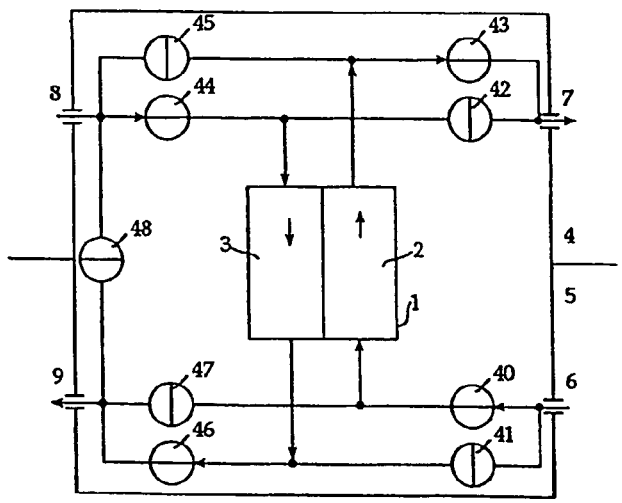
FIG. 2C shows a diagram corresponding to FIG. 2A in which single valves are applied.
Figure 2D:
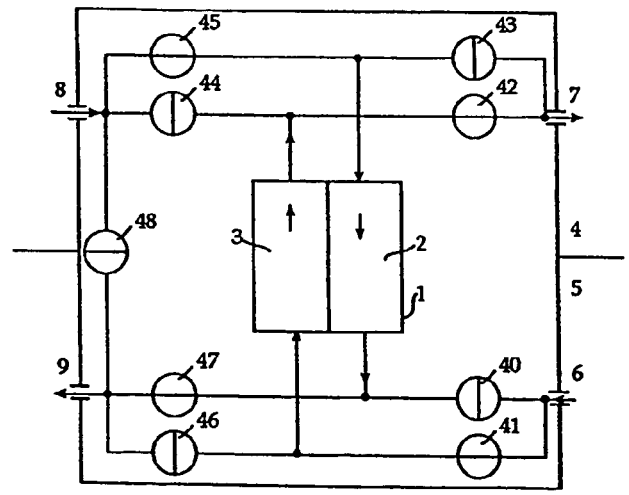
FIG. 2D shows a diagram corresponding to FIG. 2B wherein the valve configuration of FIG. 2C is applied.
Figure 2E:
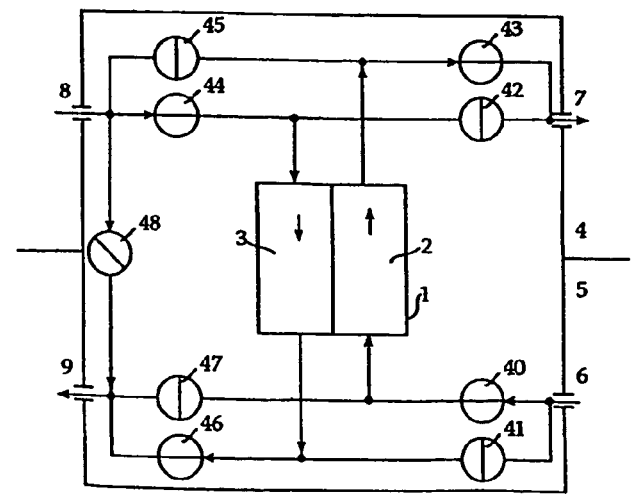
FIG. 2E shows a diagram of the valve configuration applied in FIGS. 2C and 2D in an alternative valve position.

FIGS. 2C, 2D and 2E all show an embodiment wherein use is made of individual valves 40-47 to fulfil the alternating functions fulfilled in the embodiment of FIGS. 2A and 2B by valves 10 and 11.

This embodiment further differs in providing a bypass valve 48. This valve serves to provide an extra duct from the inside to the outside) the passage of which can be regulated.

Such a duct is attractive when the outside temperature is slightly lower than the desired inside temperature and the thermal energy generated inside is sufficient to compensate the heat loss to the outside.

In the above embodiment there occurs during the alternation a temporary short-circuit which results in mixing of the mass flows. However, when a separation between mass flows is necessary, use can be made of the configuration shown in FIGS. 3A and 3B.

Use is herein made of valves 12,13. Valve 12 connects the second supply means to the first respectively the second side of the second group of ducts and connects the second discharge means to the second respectively first side of the second group of ducts.

Figures 3A, 3B:
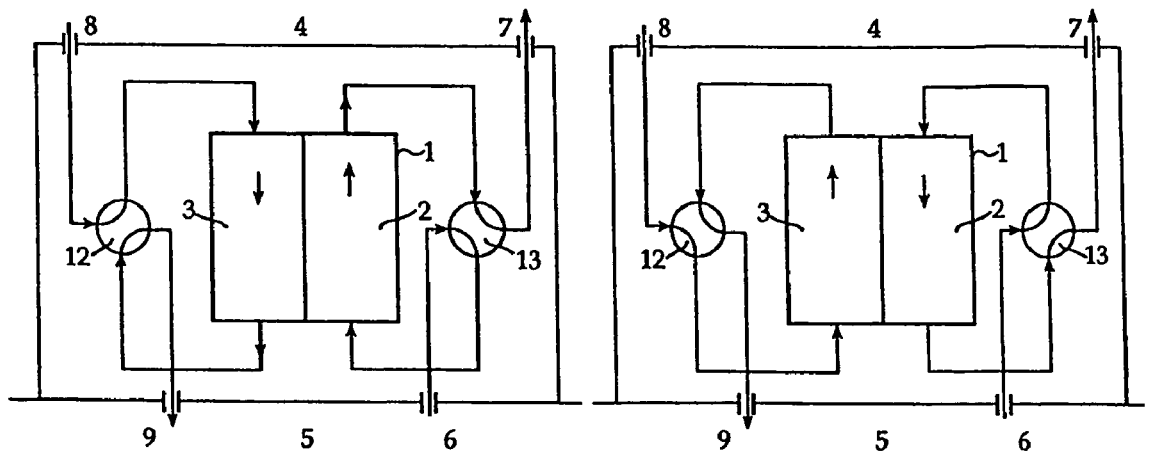
FIG. 3A shows a diagram of a second embodiment of the invention in the first position of the valves.
FIG. 3B is a view corresponding to FIG. 3A in the second position of the valves.

By rotating the valve 12 from the position shown in FIG. 3A to the position shown in FIG. 3B, only the flow direction inside the second group of ducts is reversed. It is nevertheless found that such a change in flow direction produces an effect which is positive in respect of the above noted advantages, wherein a separation between the mass flows in the first and second group of ducts is furthermore maintained.

The configuration shown in FIG. 1D can also be used in the same manner; the valve configurations which are possible here are self-evident.

Figures 4A, 4B:
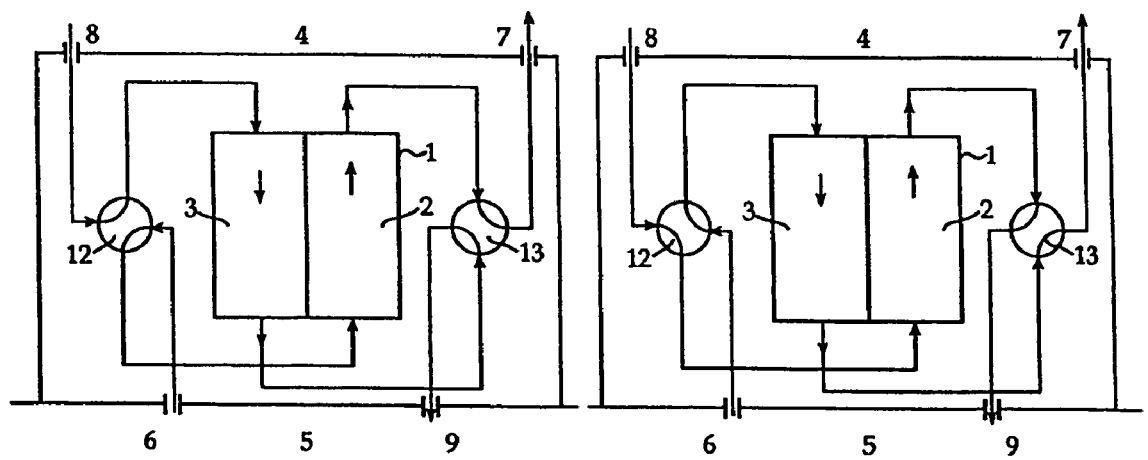
FIG. 4A shows a diagram of a third embodiment of the invention in the first position of the valves.
FIG. 4B is a view corresponding to FIG. 4A in the second position of the valves.

FIG. 4A shows a diagram for embodying the configuration according to FIG. 1D in a first position of the valves, while this same diagram is shown in FIG. 4B in the second position of the valves. This diagram is less important since, even though it achieves the advantages of the invention, it does not however achieve the advantages of the configurations according to FIGS. 1B and 1C.

Figure 5:
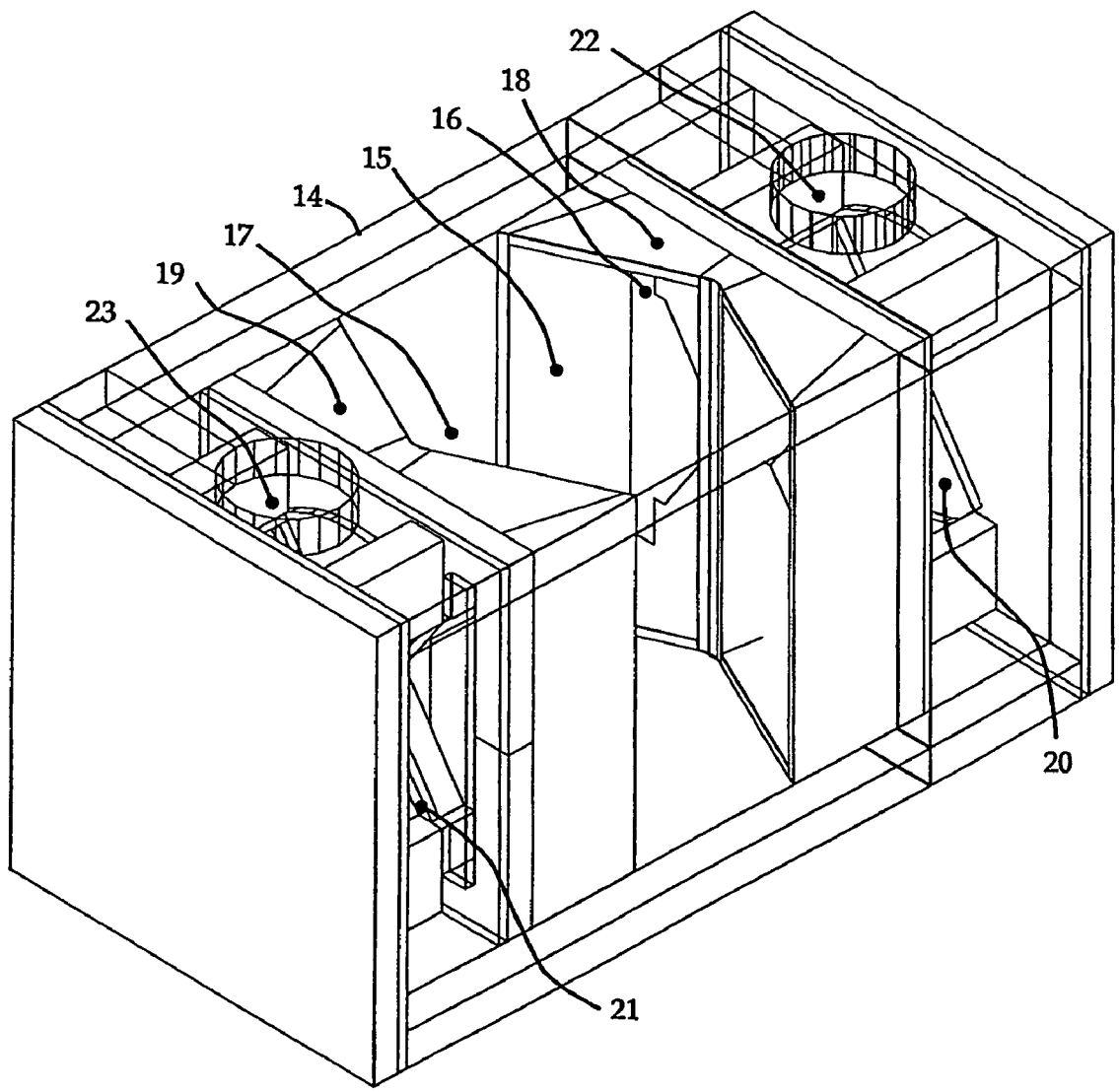
FIG. 5 is a partly broken-away perspective view of the construction according to the first embodiment of the invention.

An example of the construction of a recuperator will now be elucidated on the basis of FIG. 5. In FIG. 5 is formed a box-like structure 14, the central part of which, designated with "15", comprises two groups of ducts thermally coupled to each other. Likewise forming part of space 15 are two so-called "headers" 16,17 respectively which ensure that the first group of ducts respectively the second group of ducts is guided to a common connection. Chambers 18, 19 respectively connecting onto "headers" 16,17, are arranged in box-like structure 14.

In the chamber is arranged a valve construction designated in the drawing with 20, 21 respectively. Valves 20, 21 respectively provide for distribution of the gas flows to the relevant "headers" 16,17. For supply and discharge of gas flows to or from chambers 18,19 respectively, use is made of connecting pieces 22, 23 respectively, wherein there are a further two connecting pieces not shown in the drawing.

Figure 6:
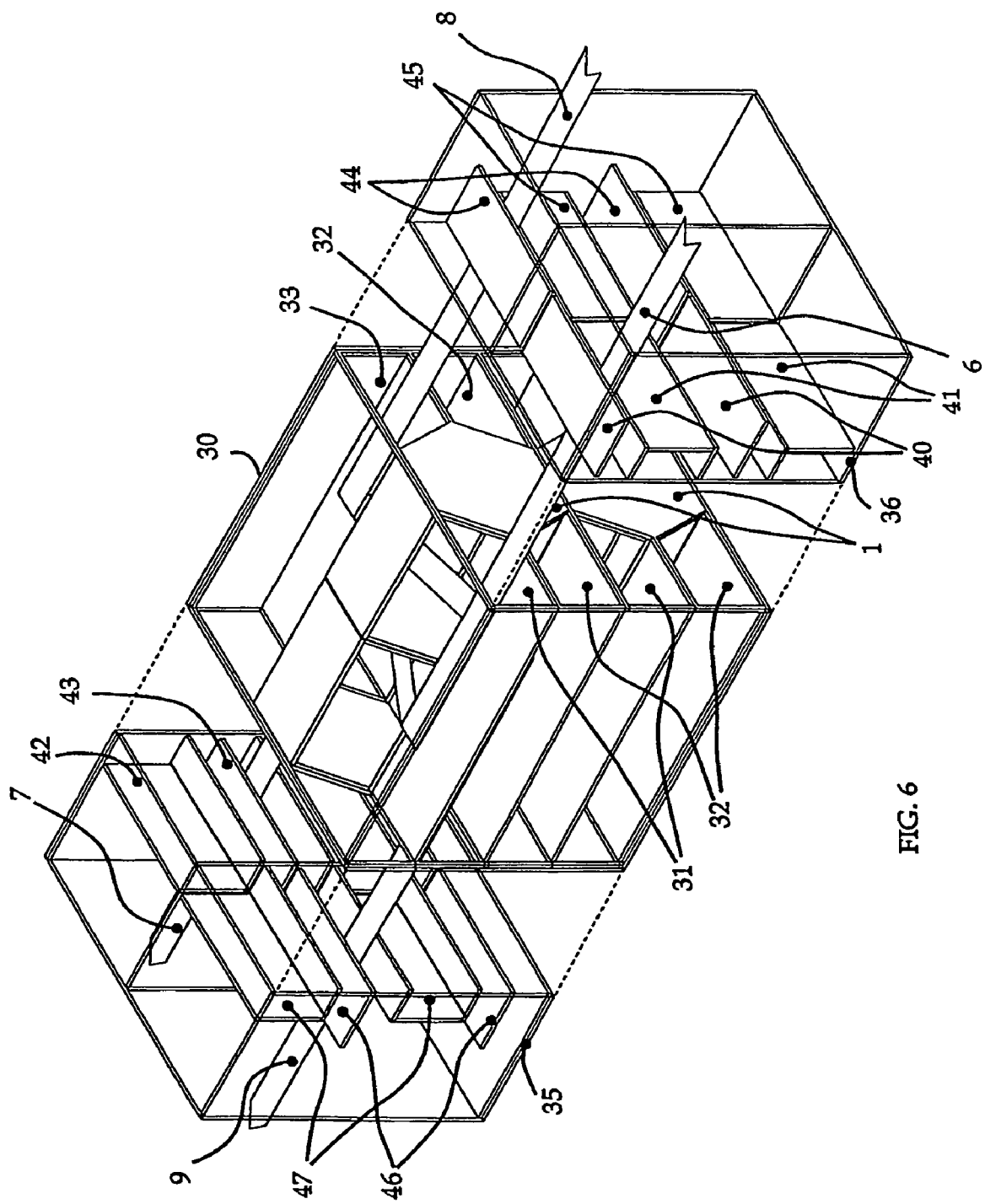
FIG. 6 is an exploded perspective view of another construction according to the first embodiment of the invention.

In FIG. 6 is shown a structure with two series of two successively placed recuperators in central part 30, the corresponding connections of which debouch in ducts 31-34 which are adjacent to these connections. The ducts are connected to chambers 35,36 with valve constructions 40-47. For supply of the gas flows use is made of connecting pieces 6-9, the numbering of which corresponds with that of FIG. 2C. A simple system is obtained by coupling the valves. Wherein using one size of recuperators a housing can be built for any desired volume of air by forming arrays of recuperators.

It is also possible to place a cooler in the discharge flow of the recuperator, whereby more condensation takes place in the recuperator and more evaporation can take place after alternation.

Figure 7A:
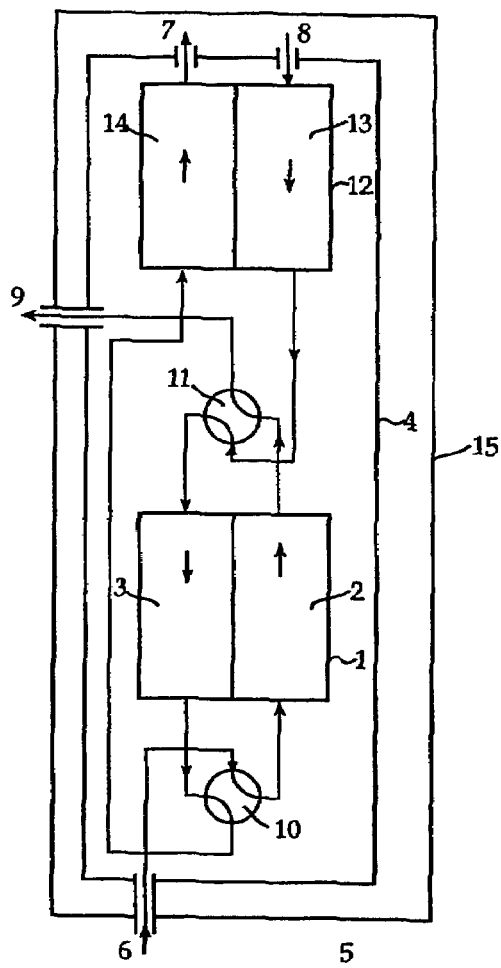
FIGS. 7A and 7B show a diagram of a fourth embodiment of the invention.
Figure 7B:
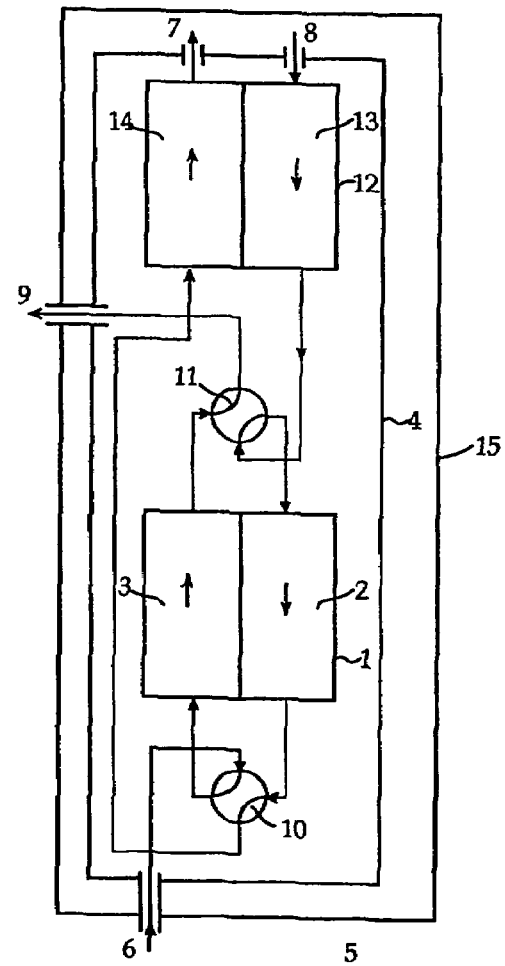

This principle can be further elaborated into the embodiment shown in FIGS. 7A and 7B, which is suitable for use in for instance greenhouses.

Dehumidifying is necessary the whole year in greenhouses, since the chance of fungal growth becomes too great above 85% relative humidity. At present this takes place during the summer and winter by opening the upper windows to a greater or lesser degree. The supply of outside air by a recuperator on the one side and discharge of the moist greenhouse air on the other is already a great improvement in respect of the energy use/misuse. A drawback is then that, just as when the windows are opened, the valuable $CO_2$ content in the greenhouse decreases. In the cultivation of green plants $CO_2$ is added by heating a boiler during the day and supplying the $CO_2$ to the greenhouse, even if the heat is not required. In FIGS. 7A and 7B a system is drawn wherein the air in the greenhouse is dehumidified without outside air being supplied to the greenhouse or $CO_2$ disappearing from the greenhouse. Greenhouse air 8 is supplied to a recuperator 12, wherein it relinquishes heat to dried greenhouse air 7. After leaving the first recuperator 12 the air is guided via valve 11 to the second recuperator 1, in which a further cooling and condensation takes place by exchanging the heat with the outside air 6 which enters the second recuperator 1 via valve 10. The cooled and dehumidified greenhouse air is then supplied to the first recuperator 12, where heating takes place to a maximum of the greenhouse air temperature 8, depending on the quality of recuperator 12. Regular alternating of valves 10 and 11, such that no condensation leaves recuperator 1, ensures that all condensation evaporates in the outside air 6 and that this (flow 9) leaves the greenhouse with increased humidity and a small temperature increase.

It will be apparent that this configuration is not only applicable in greenhouses or buildings, but that it can also be applied in other processes.

In the above described configuration the auxiliary heat exchanger is placed on the 'warm' side of the system. It will be apparent that it is also possible to place such an auxiliary heat exchanger on the 'cold' side of the system or even to place an auxiliary heat exchanger on both sides of the system.

The invention claimed is:

1. A recuperator for transferring thermal energy from a warm gas flow to a cold gas flow, comprising:
   a first group of ducts with a first connection and a second connection;
   a second group of ducts with a third connection and a fourth connection, wherein the ducts of both groups extend mutually parallel;
   first supply means for supplying the cold gas flow to the first connection;
   first discharge means for discharging the cold gas flow from the second connection;
   second supply means for supplying the warm gas flow to the third connection; and
   second discharge means for discharging the warm gas flow from the fourth connection,
wherein the device comprises alternating means for temporarily and repeatedly alternating connections from:
   the first supply means to the fourth connection;
   the first discharge means to the third connection;
   the second supply means to the second connection; and
   the second discharge means to the first connection:
wherein the alternating means comprise two alternating valves located at opposite sides of the combination of the first and second group of ducts and control means for repeatedly changing the connections.

2. The recuperator as claimed in claim 1, wherein the alternating means provides for temporarily alternating connections from:
   the first supply means to the second connection;
   the first discharge means to the first connection;
   the second supply means to the fourth connection; and
   the second discharge means to the third connection.

3. The recuperator as claimed in claim 2, further comprising a supply means for supplying water to the first group of ducts.

4. The recuperator as claimed in claim 1, further comprising a supply means for supplying water to the first group of ducts.

5. The recuperator as claimed in claim 1, wherein the alternating means provides for temporarily alternating connections from:
   the first supply means to the third connection;
   the first discharge means to the fourth connection;
   the second supply means to the first connection; and
   the second discharge means to the second connection.

6. The recuperator as claimed in claim 1, wherein the control means alternate the connections after a predetermined period has elapsed.

7. The recuperator as claimed in claim 1, wherein the control means alternate the connections when a measurement value has been reached.

8. The recuperator as claimed in claim 1, wherein the recuperator recovers thermal energy from air ventilating in a building.

9. The recuperator as claimed in claim 1, further comprising a bypass duct between the second supply means and the second discharge means, wherein a controllable valve is arranged in the bypass duct.

10. The recuperator as claimed in claim 1, wherein the first connection and the fourth connection debouch in a first chamber, the second connection and the third connection debouch in a second chamber, and wherein one of the two valves is arranged in the first chamber and the other valve is arranged in the second chamber.

11. The recuperator as claimed in claim 10, wherein the first and second chambers are placed one above another and the valves arranged in the chambers can be operated by a common operating element.

12. The recuperator as claimed in claim 1, wherein the recuperator is combined with an auxiliary heat exchanger, wherein a first group of ducts of the auxiliary heat exchanger is connected between the first discharge means and the first valve and a second group of ducts of the auxiliary heat exchanger is connected between the second group of ducts and the second supply means.

* * * * *